United States Patent [19]

Usami

[11] Patent Number: 5,896,283

[45] Date of Patent: Apr. 20, 1999

[54] CONTROLLER FOR ELECTRIC VEHICLE

[75] Inventor: Yuji Usami, Kariya, Japan

[73] Assignee: Denso Corporation, Kariya, Japan

[21] Appl. No.: 09/006,505

[22] Filed: Jan. 14, 1998

[30] Foreign Application Priority Data

Jan. 29, 1997 [JP] Japan ................... 9-014979

[51] Int. Cl.$^6$ ................ H02M 7/44; H02P 5/34
[52] U.S. Cl. ............................ 363/98; 318/801
[58] Field of Search .................. 363/55, 56, 95, 363/97, 98, 131, 132; 318/757, 758, 799, 800, 801

[56] References Cited

U.S. PATENT DOCUMENTS

| | | | |
|---|---|---|---|
| 5,123,746 | 6/1992 | Okado | 363/98 |
| 5,483,141 | 1/1996 | Uesugi | 318/811 |
| 5,617,308 | 4/1997 | Weiss et al. | 363/98 |

FOREIGN PATENT DOCUMENTS

| | | |
|---|---|---|
| 60-125103 | 7/1985 | Japan . |
| 62-48201 | 3/1987 | Japan . |
| 6-335113 | 12/1994 | Japan . |

Primary Examiner—Matthew Nguyen

Attorney, Agent, or Firm—Pillsbury Madison & Sutro LLP

[57] ABSTRACT

A power system of an electric vehicle is composed of a three-phase induction motor, an inverter for supplying alternating current converted from direct current of a battery mounted on the vehicle and a controller including a microcomputer for controlling the power supply to the motor. The controller calculates a torque required to drive the motor according to driving conditions of the vehicle. When a signal to stop the motor is generated, the power supply from the inverter to the motor is not immediately turned off but gradually decreased according to a predetermined torque decrease ratio if the motor is driven at that time with a torque higher than a predetermined level, to avoid uncomfortable vibrations of the motor associated with the abrupt turning off of the power supply thereto. The power supply to the motor is finally turned off when the torque of the motor is decreased to the level below the predetermined value. Thus, the uncomfortable vibration of the motor otherwise associated with the turning off of the power supply is avoided. Since the torque level permitting the turning off of the power supply and the torque decrease ratio are preset at optimum values based on vibration characteristics of the motor including its mounting, the motor is turned off within a reasonably short period of time after the signal to stop the motor is generated.

6 Claims, 4 Drawing Sheets

CONTROLLER FOR ELECTRIC VEHICLE

CROSS-REFERENCE TO RELATED APPLICATION

This application is based upon and claims benefit of priority of Japanese Patent Application No. Hei-9-14979 filed on Jan. 29, 1997, the content of which is incorporated herein by reference.

BACKGROUND OF THE INVENTION

1. Field of the Invention

The present invention relates to a controller for an electric vehicle including an inverter which supplies electric power to a driving motor (an alternating current induction motor), and more particularly to a controlling system which suppresses vehicle vibration occurring when power supply from the inverter to the driving motor is shut off.

2. Description of Related Art

Generally, an alternating current induction motor for an electric vehicle is driven by polyphase alternating current converted by an inverter from direct current of a battery mounted on the vehicle. The inverter is composed of plural switching elements which is controlled by pulse width modulation signals generated in a microcomputer. An example of an inverter controller of this kind is disclosed in JP-A-62-48201. In the controller disclosed, in order to suppress surge current generated in the system when an acceleration pedal is suddenly released while the driving motor is rotating at a relatively high speed, the inverter is not abruptly shut off but controlled with a predetermined duty ratio and by pulse width modulation signals which are common to each phase. Since the driving motor is mounted on a vehicle with a resilient material such as rubber bushings, the driving motor vibrates as a reaction when a driving torque of the motor is rapidly decreased. This kind of vibrations is generated when the acceleration pedal is released or a shift lever is shifted from a driving position to a neural position and thereby the switching operation of the inverter is shut off. The vibrations are much detrimental to drive feeling. The controller disclosed in the aforementioned publication which aims at suppressing the surge current is not effective or sufficient to solve the problem of vibrations.

SUMMARY OF THE INVENTION

The present invention has been made in view of the above-mentioned problem, and an object of the present invention is to provide a controller for an electric vehicle which eliminates or suppresses uncomfortable motor vibrations generated when electric power supply to the motor is turned off by shutting off the switching operation of the inverter.

The electric vehicle is driven by a driving motor which is an alternating current induction motor. The alternating current is supplied to the motor from an inverter which converts direct current of a battery mounted on the vehicle to the alternating current by switching operation thereof. A torque required to drive the motor is calculated by a microcomputer of the controller according to driving conditions of the electric vehicle. An electric power corresponding to the required torque calculated is supplied from the inverter to the motor.

When a signal to stop the power supply is generated (when a shift lever is shifted to a NEUTRAL position or an accelerator is closed), a motor torque with which the motor is driven at that time is compared with a permissible maximum torque which is predetermined based on vibration characteristics of the motor including its mounting and with which the power supply to the motor can be turned off without causing any harmful or uncomfortable vibrations. If the required torque is larger than the permissible maximum torque, the required torque is decreased to a level of the permissible maximum torque with a predetermined decrease ratio. After the required torque has been decreased to the level of the permissible maximum torque or lower, the power supply from the inverter to the motor is turned off by discontinuing the switching operation of the inverter. Thus, the uncomfortable motor vibrations otherwise occurring when the power supply to the motor is turned off are sufficiently suppressed or eliminated.

The level of the permissible maximum torque is predetermined at an optimum level based on vibration characteristics of the motor including its mounting condition and stored in the computer. The harder the motor is mounted on the vehicle, the higher the level of the permissible maximum torque can be made. The ratio, with which the required torque is decreased to the level of the permissible maximum torque, is predetermined at an optimum level based on the motor vibration characteristics including its mounting conditions and stored in the computer. If the torque decrease ratio is too low, a period of time required to actually turn off the power supply after the signal to stop the power supply is generated becomes unnecessarily long. On the other hand, if the decrease ratio is too high, the motor vibrates because the power supplied to the motor is too rapidly reduced. The torque decrease ratio has to be set so that a frequency of the motor vibration is suppressed.

By setting the permissible maximum torque and the torque decrease ratio at optimum levels, the controller according to the present invention performs the desired function to turn off the power supply to the motor without causing uncomfortable vibrations of the motor. Further, the time required to actually turn off the power supply after the signal to stop the inverter is generated can be made reasonably short.

Other objects and features of the present invention will become more readily apparent from a better understanding of the preferred embodiment described below with reference to the following drawings.

DETAILED DESCRIPTION OF THE PREFERRED EMBODIMENT

Figure 1:
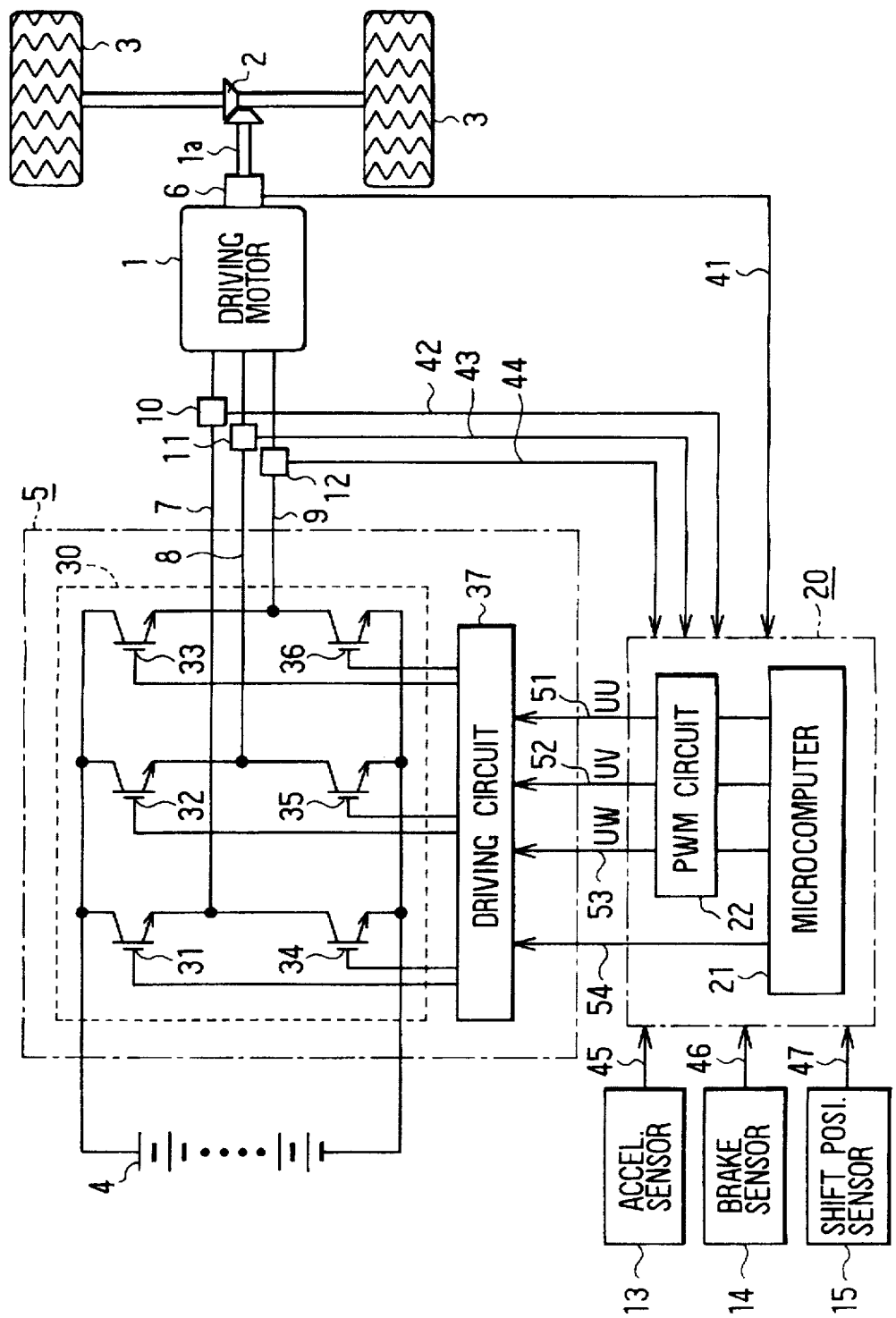
FIG. 1 is a circuit diagram showing a controller for an electric vehicle according to the present invention.

Referring to the drawings, an embodiment according to the present invention will be described. An electric vehicle is driven by a three-phase alternating current induction motor to which alternating current is supplied from an inverter forming three-phase alternating current by switching direct current supplied from a battery mounted on the vehicle. Operation of the inverter is controlled by a drive controller including a microcomputer. In FIG. 1, a driving motor 1 is mounted on an electric vehicle via rubber bushings (rubber cushions), and its output shaft 1a is connected to a pair of driving wheels 3 via a differential gear 2. A battery 4 is a conventional lead-acid battery mounted on the vehicle. An inverter 5 forms three-phase alternating current by switching direct current of the battery 4. The alternating current from the inverter 5 having three phases, U, V and W drives the driving motor 1.

A rotational speed sensor 6 is disposed on the output shaft 1a of the driving motor 1. The rotational speed sensor 6 detects rotational speed of the motor 1 and angular positions of its rotor. The sensor 6 is composed of, for example, a conventional resolver and an R/D converter circuit, and generates pulse signals for each rotational unit angle representing rotational speed of the motor 1 and serial signals for each rotational unit angle representing angular positions of the rotor. Both signals (rotational speed and angular position signals) are fed into a drive controller 20 via a signal wire 41. Current sensors 10, 11 and 12 are disposed in power supply lines 7, 8 and 9 (corresponding to U, V and W phases, respectively). Signals from the respective current sensors are fed to the drive controller 20 via signal wires 42, 43 and 44, respectively.

An acceleration sensor 13 is coupled with an accelerator (not shown in the drawing) and generates signals representing an accelerator opening degree controlled by a driver by pressing down an accelerator pedal. A brake sensor 14 is coupled with a braking system and generates signals representing a brake oil pressure controlled by a driver by pressing down a brake pedal. A shift position sensor 15 is coupled with a shift lever operated by a driver and generates signals representing respective shift lever positions, DRIVE, NEUTRAL, BACKWARD and PARKING. These signals (acceleration, brake and shift positions) are fed to the drive controller 20 via signal wires 45, 46 and 47, respectively. When the shift lever takes a DRIVE position, the driving motor 1 is driven forward according to the degree of accelerator opening. When the shift lever takes a NEUTRAL position the motor is stopped independently from the degree of accelerator opening. When the shift lever takes a BACKWARD position, the motor 1 is driven backward according to the degree of accelerator opening. At a PARKING position the motor 1 is not driven.

The drive controller 20 includes a microcomputer composed of conventional CPU, ROM, RAM, backup RAM and I/O circuits, etc and drives the inverter 5 based on various signals fed thereto via signal wires 41 through 47. The drive controller 20 calculates motor torque Tm required under various driving conditions based on signals fed thereto (the rotational speed of the motor, the angular position of the rotor, the accelerator opening, the brake oil pressure and the shift lever positions) and calculates current supply command vectors for supplying current to the motor necessary to generate the required torque Tm in the motor in a well known vector calculation. In calculating current supply vectors, the drive controller 20 monitors the U-phase current signal and the W-phase current signal fed from the signal wires 42 and 44, respectively, and thereby the supply current phases are precisely controlled. A pulse width modulation circuit 22 (PWM circuit) generates pulse width modulation signals, UU, UV and UW for controlling the pulse widths for respective three phases based on the command from the microcomputer 21. The pulse width modulation signals are fed to the inverter 5 via signal wires 51, 52 and 53, respectively. The inverter 5 supplies the required current to the driving motor 1 to generate the required torque Tm therein.

The inverter 5 is composed of a main circuit 30 having six switching elements 31 through 36 made of, for example, insulated gate bipolar transistors (IGBT) and a driving circuit 37 for driving the switching elements. The inverter 5 converts direct current of the battery 4 into alternating current by turning the switching elements on and off. The driving circuit 37 insulates the driving circuit 20 from the electric potential of the main circuit 30 and controls the switching operation (chopper operation) of the switching elements 31 through 36 based on the pulse width modulation signals UU, UV and UW fed from the PWM circuit 22 via the signal wires 51, 52 and 53.

When a driver releases the acceleration pedal or shifts the shift lever from DRIVE to NEUTRAL during driving, a signal to stop the inverter switching operation is fed into the drive controller 20. Under this condition, the switching operation of the inverter 5 is stopped and the driving torque of the motor 1 is abruptly reduced in a conventional system, which in turn generates uncomfortable vibrations of the motor as a reaction of the abrupt stoppage. To eliminate or suppress this kind of vibrations, the controller according to the present invention judges whether the required motor torque Tm (which is equal to the torque being supplied) at the time when the signal to stop the inverter is generated is higher than a predetermined level before the switching operation of the converter 5 is actually stopped. If the required torque Tm (its absolute value |Tm|) is higher than the predetermined level, the torque Tm is gradually decreased (that is, the power supply level to the motor is gradually decreased) and the switching operation of the inverter 5 is stopped after Tm has been lowered to a permissible level to prevent vibrations as a reaction of the stoppage. Such command to actually stop the inverter 5 is fed to the driving circuit 37 from the microcomputer 21 via a signal wire 54. If the required torque Tm is lower than the predetermined level at the time the signal to stop the inverter is generated, the inverter is immediately stopped according to the command to stop the inverter.

Figure 2:
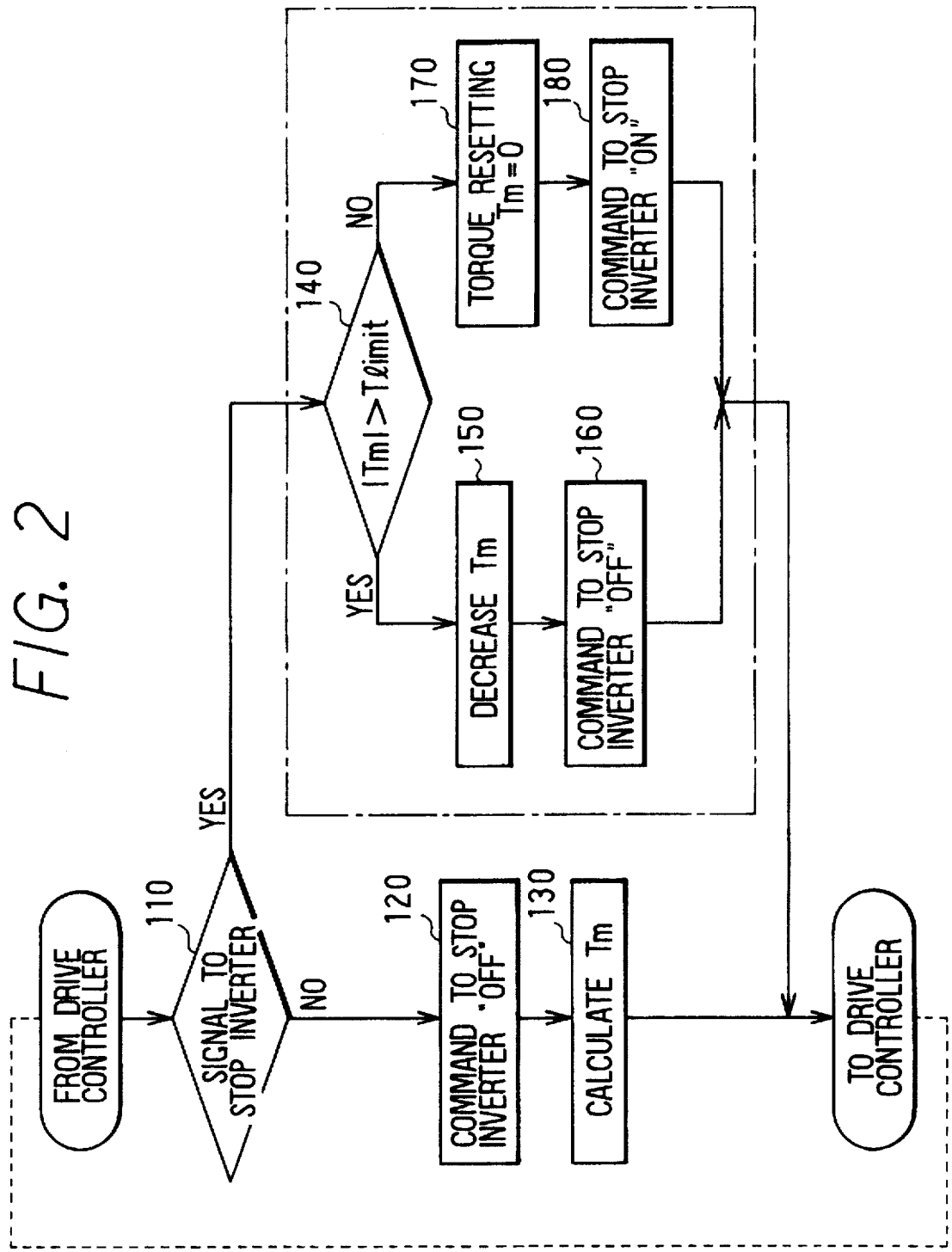
FIG. 2 is a flow chart showing operation of a microcomputer for stopping an inverter used in the controller shown in FIG. 1.

Referring to a flow chart in FIG. 2 showing a part of operations performed by the microcomputer 21, details of the control of the switching operation of the inverter 5 will be described. At a step 110, whether the signal to stop the inverter (whether the accelerator is closed or the shift lever takes the NEUTRAL position) exists or not is judged. If the answer is NO (that is, the accelerator is not closed while the shift lever takes the DRIVE or BACKWARD position), the routine moves to a step 120. At the step 120, the microcomputer 21 generates a command to continue the operation of inverter 5 (turn off a command to stop the inverter), and this command is fed to the driving circuit 37 via the signal wire 54. Then the routine moves to a step 130 where the required torque Tm is calculated based on information such as the rotational speed of the motor, the angular position of the motor, the degree of the accelerator opening, the brake oil pressure and the position of the shift lever. The inverter 5 is operated so as to supply power corresponding to the required torque Tm to the motor.

If the judgment of the step 110 is YES (if the signal to stop the inverter exists), the routine moves to a step 140. At the step 140, whether the absolute value of the required torque |Tm| (which corresponds to the power supplied from the inverter) is larger than a permissible maximum torque $T_{limit}$. The permissible maximum torque $T_{limit}$ is a predetermined value with which the power supply from the inverter can be turned off without causing uncomfortable vibrations of the motor. If the answer is YES (|Tm|>$T_{limit}$), the routine moves to a step 150, and if NO, the routine moves to a step 170. The value of Tm is positive when the motor is driven by electric power supplied thereto, and it is negative when the motor is driven mechanically by the driving wheels. Therefore, the absolute value of Tm is used as a value to be compared with $T_{limit}$.

Figure 4:
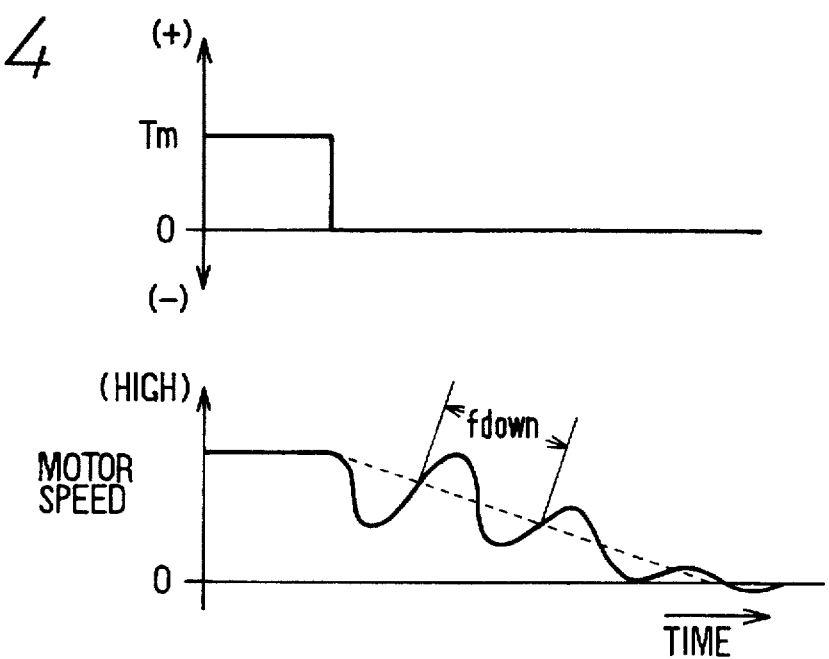
FIG. 4 is a timing chart showing vibrations of a driving motor when a power supply to the motor is shut off.
Figure 5:
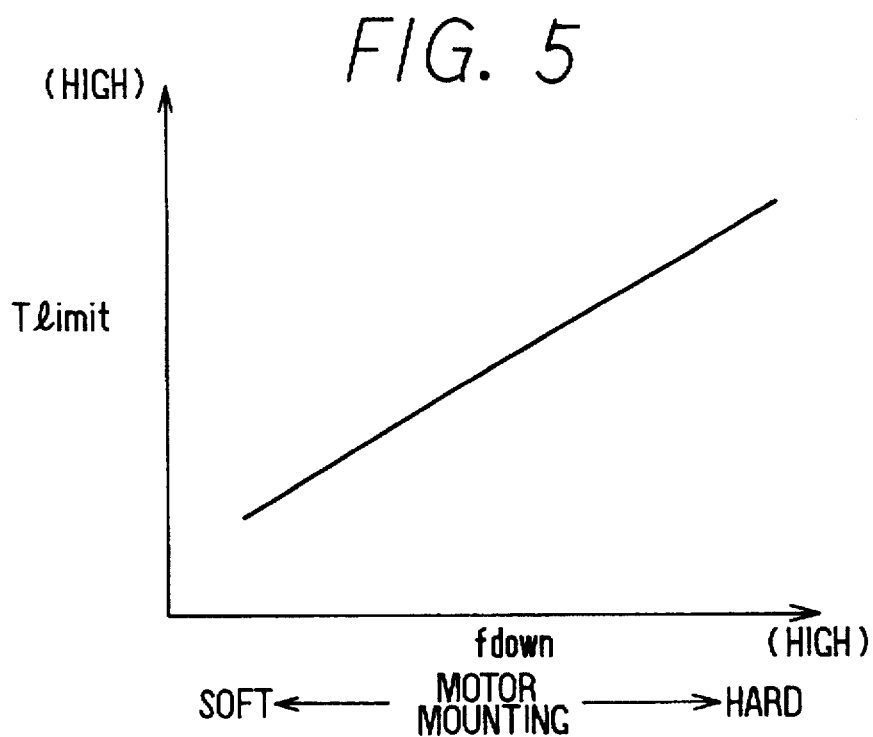
FIG. 5 is a graph showing a relation between a motor vibration frequency and a permissible maximum motor torque.

The permissible maximum torque $T_{limit}$ is determined, as shown in FIG. 5, based on a motor vibration frequency $f_{down}$ which is dependent on a motor mounting condition (how rigidly or softly the motor is mounted on the vehicle chassis), considering also other factors such as vibration characteristics of a system including tires. The motor vibration frequency $f_{down}$ can be determined as illustrated in FIG. 4. The power supply corresponding to the required torque Tm is abruptly turned off, whereby the motor speed varies as shown in the graph. The frequency of this vibration is $f_{down}$ which is higher when the motor is mounted rigidly and lower when it is mounted softly. The permissible maximum torque $T_{limit}$ is predetermined so that it becomes higher as the motor vibration frequency $f_{down}$ becomes higher, as shown in FIG. 5.

Figure 6:
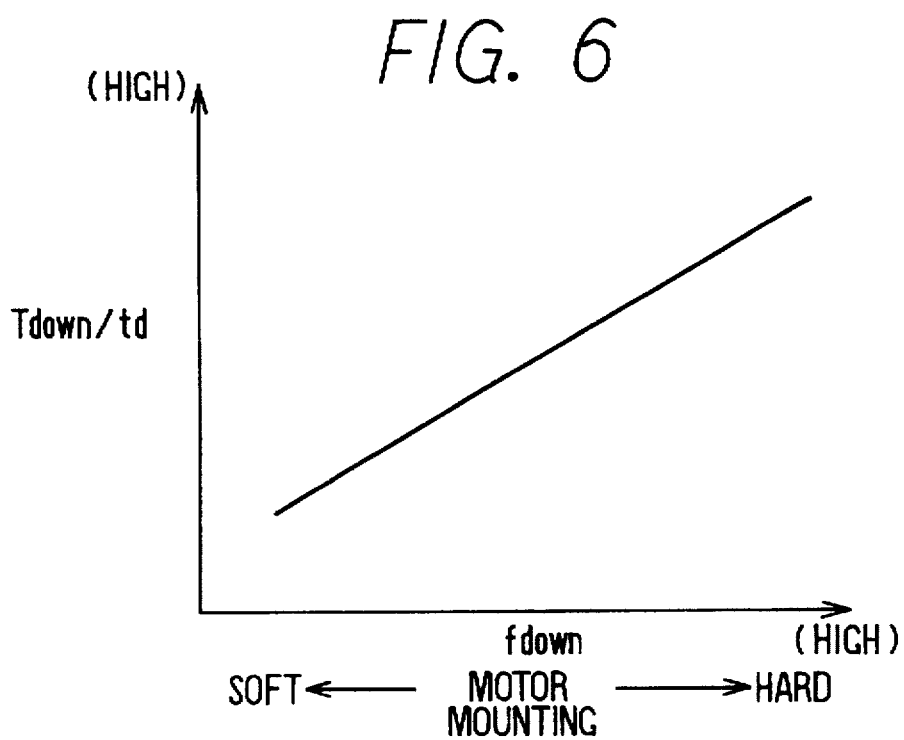
FIG. 6 is a graph showing a relation between the motor vibration frequency and a torque decrease ratio.

At the step 150 (FIG. 2), the microcomputer 21 decreases the required torque Tm according to a predetermined ratio until it reaches the permissible maximum torque $T_{limit}$. The predetermined ratio $T_{down}$/td is set as shown in FIG. 6, where $T_{down}$ is a difference between Tm and $T_{limit}$ and td is a period of time in which Tm is decreased to the level of $T_{limit}$. During the period of time td, a step 160 turns off a command to stop the inverter, and, the inverter 5 continues to supply power corresponding to an instant value of Tm to the motor 1. After the Tm has been decreased below the level of $T_{limit}$ at the step 150, that is, after the answer of the step 140 has been turned to NO, the routine moves to a step 170.

On the other hand, the answer of the step 140 is originally NO, that is, |Tm| is equal to $T_{limit}$ or lower, the routine moves to 170. At the step 170, the required torque Tm (which corresponds to the electric power supplied from the inverter 5 to the motor 1) is reset at zero. Then, the routine moves to a step 180 where the command to stop the inverter is generated and sent to the driving circuit 37 via the signal wire 54. Thus, the switching operation of the inverter 5 is turned off to discontinue the power supply to the motor 1.

Figure 3:
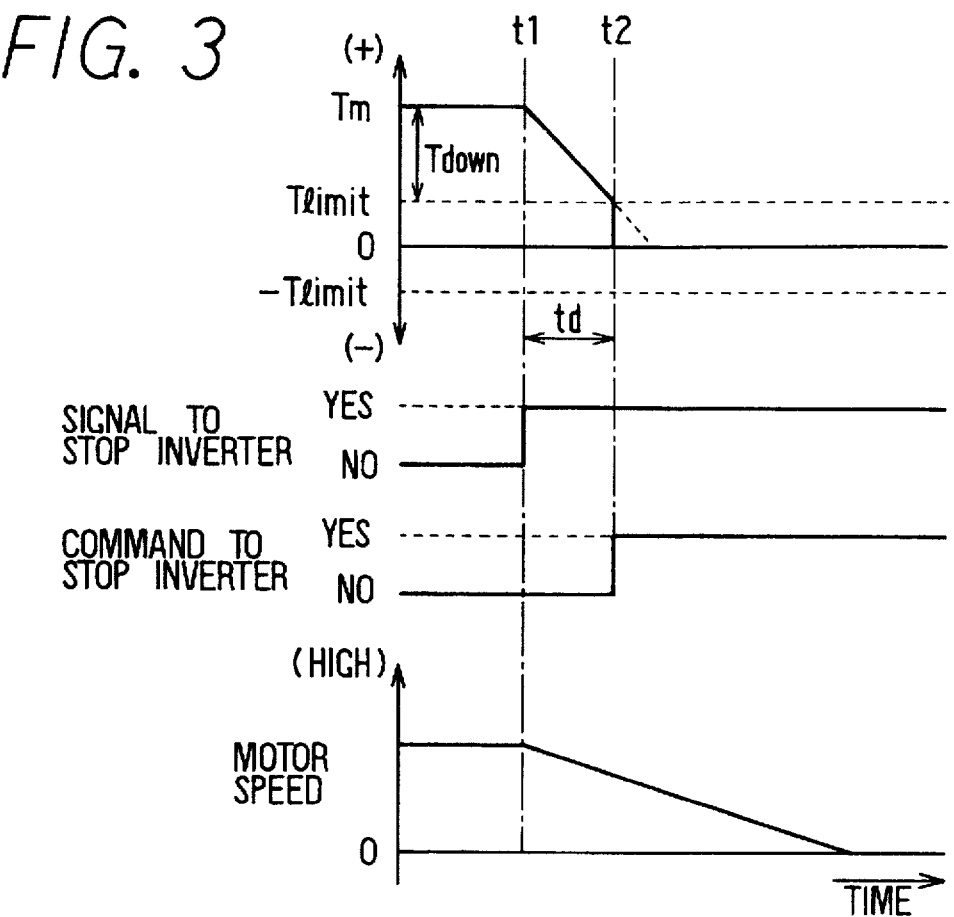
FIG. 3 is a timing chart showing a motor torque, a signal to stop the inverter, a command to stop the inverter and a motor speed, all combined on the same time scale on abscissa.

Referring to FIG. 3 which is a timing chart showing the process of stopping the switching operation of the inverter 5, the timing of the process will be explained. The inverter 5 supplies electric power corresponding to the required torque Tm until time t1 to the motor 1. As the signal to stop the inverter is generated (by closing the accelerator or shifting the shift lever to the NEUTRAL position) at the time t1, whether the torque Tm is larger than $T_{limit}$ is judged. If the Tm is larger than the $T_{limit}$, the power supply is not shut off at this time t1 but the torque Tm is decreased with the torque decrease ratio $T_{down}$/td until it reaches the level of the permissible maximum torque $T_{limit}$. When the Tm reaches the level of the $T_{limit}$ at time t2, the command to stop the inverter 5 is sent to the inverter driving circuit 37 and the switching operation of the inverter is stopped. This means that after the power supply level has been sufficiently lowered to the level which does not cause any uncomfortable vibrations, the switching operation of the inverter is stopped. The rotational speed of the motor 1 begins to decrease at the time t1 and is gradually and smoothly decreased thereafter as shown in the last graph of FIG. 3. When the accelerator is closed and the shift lever is at the DRIVE position, the motor 1 is mechanically driven by the driving wheels 3 and thereby the required torque Tm becomes a negative value. At this instance, when the signal to stop the inverter is generated, the absolute value |Tm| is compared with $T_{limit}$, and if |Tm| is larger than $T_{limit}$, |Tm| is decreased with the torque decrease ratio until it reaches the level of $T_{limit}$. At the time |Tm| becomes equal to or lower than $T_{limit}$, the command to stop the inverter is sent to the driving circuit 37 to shut off the switching operation of the inverter 5.

In the process of stopping the inverter operation described above, the step 110 (in FIG. 2) functions as a first step and the step 140 as a second step to judge the shutting off of the inverter operation. The step 150 acts to decrease the required torque Tm according to the predetermined ratio and the step 180 generates the command to stop the inverter.

The present invention provides the following advantages: (a) Since the inverter is not shut off immediately after the signal to stop the inverter is generated, but the power supply from the inverter to the motor is decreased according to a predetermined ratio and is shut off after it is lowered to a predetermined level, uncomfortable vibrations of the motor are avoided. (b) Since the power supply from the inverter (corresponding to the required torque Tm) is decreased with an optimum ratio after the signal to stop the inverter is generated, a period of time required to actually turn off the motor does not become unnecessarily long. Though a system in which the power supply from the inverter is shut off after a slip frequency of the motor is gradually decreased to zero is disclosed in JP-A-60-125103, this system requires a longer time to completely turn off the motor compared with the system of the present invention. (c) Since the torque decrease ratio $T_{down}$/td is preset at an optimum level to suppress the vibrations of the motor, the time required to turn off the inverter after the signal to stop the inverter is generated can be made as short as possible. (d) Since the permissible maximum torque $T_{limit}$ is preset based on the vibration characteristics of motor mounting, the motor can be turned off after the required torque Tm becomes below the level of $T_{limit}$ without causing any uncomfortable vibrations. (e) Since the rotational speed sensor 6 is mounted on the output shaft 1a of the motor, an actual vehicle speed is detected by the sensor without fail.

The foregoing embodiment of the present invention may be modified in various ways. In the foregoing embodiment, the required torque Tm is decreased linearly with a constant ratio $T_{down}$/td after the signal to stop the inverter is generated in the foregoing embodiment. This may be modified so that Tm is decreased with a higher rate in a period immediately after the signal to stop the inverter is generated and with a lower rate thereafter. In this manner, the inverter may be more smoothly turned off. The parameters, such as the permissible maximum torque $T_{limit}$ and the torque decrease ratio $T_{down}$/td are predetermined based on the motor vibration frequency $f_{down}$ which is a fixed and specific value of a vehicle, and are preset in the computer in the foregoing embodiment. However, it is possible to design the system in which these parameters can be changed from the outside of the computer. For example, in case tires are changed from normal to snow tires in winter, the parameters may be switched to values suitable to vibration characteristics of the snow tires. In this manner, optimum control of the inverter is possible irrespective of the change of the vehicle vibration characteristics. Though, the permissible maximum torque $T_{limit}$ is set at the same level for both positive and negative sides of the required torque TM in the foregoing embodiment, the level of the $T_{limit}$ may be differently set. For example, it may be set at a higher level for the positive Tm and a lower level for the negative Tm, or vice versa.

The controller for an electric vehicle according to the present invention is described, assuming that it will be used in an electric vehicle which is driven solely by an electric motor. The controller, however, may be used also in a so-called hybrid vehicle which is driven by an engine and an electric motor connected in series or in parallel with each other.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A controller used in a power system for an electric vehicle having a driving motor and an inverter for supplying alternating current converted from a direct current power source to the motor, the controller comprising:

means for calculating a required torque to drive the driving motor according to driving conditions of the electric vehicle;

means for generating a signal to stop an operation of the inverter;

means for judging upon receipt of the signal to stop the operation of the inverter, whether the required torque at that time exceeds a permissible maximum torque predetermined from vibration characteristics of the driving motor;

means for decreasing the required torque to a level of the permissible maximum torque with a predetermined decrease ratio when the required torque exceeds the permissible maximum torque; and means for generating a command to actually stop the operation of the inverter after the required torque is decreased to a level equal to or lower than the permissible maximum torque.

2. A controller according to claim 1, wherein the predetermined decrease ratio is set to cancel vibrations of the driving motor generated at its mounting portion during decreasing the required torque.

3. A controller according to claim 2, wherein the predetermined decrease ratio is set at a higher level as a vibration frequency of the motor becomes higher.

4. A controller according to claim 1, wherein the permissible maximum torque is predetermined based on vibration characteristics of the driving motor including a mounting portion thereof.

5. A controller according to claim 4, wherein the permissible maximum torque is set at a higher level as a vibration frequency of the motor becomes higher.

6. A method of turning off electric power supply to a driving motor mounted on an electric vehicle, the method comprising steps of:

calculating a torque required to drive the motor according to driving conditions of the electric vehicle;

supplying electric power corresponding to the required torque calculated to the motor;

generating a signal indicating that a condition to turn off the power supply exists;

comparing the required torque with a predetermined maximum torque, the electric power supply corresponding to which can be turned off without causing harmful vibrations of the motor, upon receipt of the indicating signal;

decreasing a level of the required torque with a predetermined decrease ratio to a level of the predetermined maximum torque if the required torque is higher than the predetermined maximum torque; and turning off the power supply to the motor after the required torque has been decreased to a level lower than the level of the predetermined maximum torque.

* * * * *